United States Patent [19]

Kolb, Jr. et al.

[11] 4,240,046

[45] Dec. 16, 1980

[54] MOUNT FOR A LASER BREWSTER ANGLE WINDOW

[75] Inventors: William P. Kolb, Jr., Carlsbad; Keith G. Schmidt, Vista, both of Calif.

[73] Assignee: Hughes Aircraft Company, Culver City, Calif.

[21] Appl. No.: 949,826

[22] Filed: Oct. 10, 1978

[51] Int. Cl.³ .................................................. H01S 3/02
[52] U.S. Cl. ............................ 331/94.5 D; 331/94.5 C
[58] Field of Search ........................ 331/94.5 C, 94.5 D

[56] References Cited

U.S. PATENT DOCUMENTS

| 3,656,067 | 4/1972 | Zavodny | 331/94.5 C |
| 3,986,141 | 10/1976 | Bulthuis et al. | 331/94.5 C |

Primary Examiner—William L. Sikes
Attorney, Agent, or Firm—W. H. MacAllister; E. N. Kramsky; G. L. Cline

[57] ABSTRACT

A laser utilizing a unique assembly for mounting a Brewster angle window. The mounting assembly includes an elongated annular member having a transverse slot at the appropriate Brewster angle to the plane perpendicular to the axis of the annular member. A rectangular window is held in place in the slot by the tension of a leaf spring. The mounting assembly may then be inserted in place at either the anode or cathode ends of the laser and permanently held in place without introducing any stresses in the window or affecting its alignment.

3 Claims, 3 Drawing Figures

MOUNT FOR A LASER BREWSTER ANGLE WINDOW

FIELD OF THE INVENTION

The invention relates generally to laser technology and in particular to a unique mount for a Brewster window.

DESCRIPTION OF THE PRIOR ART

Gas lasers are generally constructed by two techniques; the first technique utilizes a plasma tube bottle in which windows (usually Brewster angle windows) are attached to the vacuum envelope and in which the regenerative cavity mirrors are supported externally to the bottle. The second technique, generally referred to as the internal mirror method, places usually only one Brewster window within a chamber at either the anode or cathode end of the plasma tube and laser mirrors are then attached directly to the vacuum bottle so that the mirrors complete the vacuum envelope. The mirror is usually a multilayer dielectric coating deposited on a cylindrical glass substrate and then sealed in place with a glass frit or glass solder (this was previously done with an epoxy). The entire laser tube is usually placed in an oven at 450° C. so that the mirror assembly is fritted to the anode assembly, for example.

More and more the laser industry is turning to the hard seal technique even though such technique poses certain problems. In order to hard seal a Brewster window and mirror into place, they must be pre-aligned to the bore of the resonant or laser cavity and they must be pre-aligned to each other. Pre-alignment has been a difficult proposition, heretofore, due to the techniques that have been used. First, the Brewster window had to be placed in alignment with the lasing cavity and held in place. One method of mounting the window was to epoxy the window to a hollow truncated pedestal which was placed within the anode, for example. This is not an entirely satisfactory solution, for the epoxy would out-gas contaminants and sputter as a result of being bombarded by the high energy particles, such as ionized gas atoms or molecules. Also, hard sealing operations require heat which precludes use of organics. Such sputtering causes the epoxy to be deposited on other parts of the lasing cavity, thereby reducing the already low efficiency of the laser or even causing the devices to stop lasing.

Another method is to hold the window in place against the pedestal by means of a coil spring situated about the periphery of the window. The major drawback of such an arrangement is that it is almost impossible to determine whether the window is being stressed such that the plane of polarization is adversely affected. It is well known that any stress, even the slightest, placed on the Brewster window causes strain induced birefringence, resulting in the plane of polarization and polarization purity being distorted. Such distortion, of course, interferes with the function of the laser. Another limitation is that, after mounting the window in place, it is practically impossible to check that the window is properly aligned at the requisite angle.

Still another method of mounting a Brewster window has been to hold the window in the same manner as a microscope slide is held in place, i.e. by a pair of spring fingers. The limitation of such an arrangement is that any variance in the pressure exerted by either of the fingers on the window causes birefringence and distortion within the window.

Another limitation of most prior art Brewster window mountings has been that the edges of such windows brush against the interior surfaces of the laser cavity and fine particles of the glass are thus chipped from the usually acute angle edges. These fine particles or glass dust adversely affect the laser operation, especially if they coat the window or the mirror surface.

SUMMARY OF THE INVENTION

Accordingly, it is an object of the present invention to provide a laser having an improved, economical, and more reliable mounting for a Brewster window.

It is another object of the present invention to provide a mount for a Brewster window eliminating stress within that window.

It is another object of the present invention to provide a Brewster window mount which maintains the window captive and eliminates substantially all possiblity of movement.

It is yet another object of the present invention to provide a Brewster window mount which protects the window from being damaged during assembly and hard sealing.

It is still another object to provide a Brewster window mount system for facilitating the test and alignment of said window.

In accordance with the foregoing objects a Brewster window mount for a laser includes a sleeve that is slotted at the Brewster angle for mounting a Brewster window therein and being held in place by fastening means.

DETAILED DESCRIPTION OF THE DRAWINGS

Figure 1:
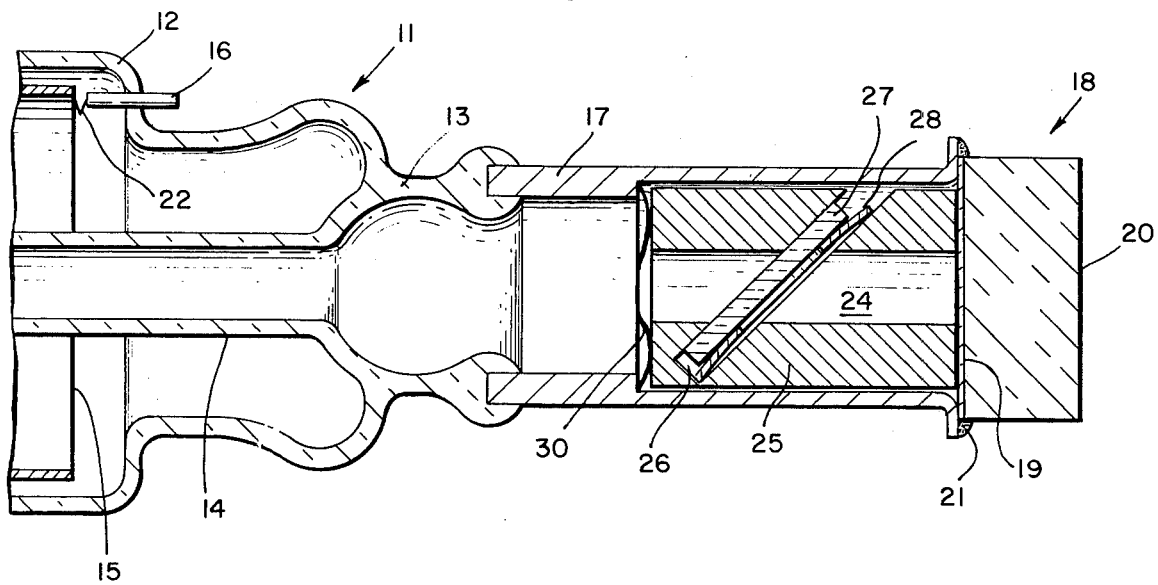
FIG. 1 is a cross-sectional view of a Brewster window mount within a laser according to the present invention.

Referring more specifically to FIG. 1, a laser 10 includes an elongated plasma tube 11 having a relatively larger diameter main body envelope portion 12 and a relatively smaller diameter anode envelope portion 13. An elongated capillary discharge tube 14 is supported by the anode envelope 13. The plasma tube 11 holds an active laser gas or mixture such as He-Ne, for example. The gas is allowed to circulate within the plasma tube 11, the capillary tube 14, and an aperture in the capillary tube 14 at the other end (not shown) of the tube 14.

The anode envelope 13 is attached to one end of a metal sleeve anode member 17 which contains the Brewster window assembly 24. The other end of the metallic sleeve 17 may be flared for mounting a mirrored substrate 18 by means of a glass frit 21. The mirror 18 may consist of a cylindrical glass substrate 20 having a quarter-wave filter 19 or may be a series of coatings deposited on the glass substrate which selectively reflects the particular wavelength of the subject lasing gas. Any other suitable mirror or filter may be utilized.

In manufacturing the laser 10, the Brewster window assembly 24 is placed within the metal sleeve anode member 17. The mirror 18, with the quarter-wave filter 19 facing the interior of the capillary discharge tube 14, is placed over the flared end of the metal sleeve anode member 17. The glass frit 21 is placed about the base of the mirror 18 and the flared portion of the member 17. After assembling the components together, the entire assembly is placed in a 450° C. oven where the glass frit 21 melts and seals the mirror 18 to the flared end of the sleeve 17.

The active laser gas may be excited to a lasing state by any conventional pump means such as a conventional pump source connected to a discharge arrangement including the anode electrode 17 and a cylindrical cathode electrode 15 whose outer surface substantially coincides with the inner surface of the plasma tube 11. The cathode 15 may be fabricated from aluminum or tantalum, preferably with a thin oxide layer on its inner surface. The cathode electrode 15 is connected to a cathode conductive pin 16, made of Kovar, for example, by means of spring like conductive contactors 22.

The Brewster window mount 24 includes a small elongated annular member such as a sleeve 25. The sleeve 25 may be any convenient size depending upon the type of laser gas that is being used. For example, for a low power He-Ne laser a sleeve 25 may be 0.5 inches in length; the outside diameter is 0.25 inches and the inside diameter is 0.100 inches. The inside diameter is sufficiently large so as to allow the light waves to pass therethrough. A deep slot 26, 0.060 inches wide, is cut or milled transversely to the axis of the sleeve 25 at an appropriate Brewster angle to the plane perpendicular to the axis of the annular sleeve 25. The Brewster angle of a window is dependent upon two factors, the wavelength of the lasing medium and the index of refraction of the window material. For a lasing medium of He-Ne with a wavelength of 632.8 mm and a fused silica Brewster window, the Brewster angle is 55°. A Brewster window 27 is inserted into the slot and held in place by a leaf spring 28. The spring 28 is made of tempered material and held to close tolerances so that there is sufficient pressure on the window to hold it in place but not so much that the window 27 is distorted. The bore of the sleeve 25 is sufficiently large such that it does not interfere with the discharge tube's lasing properties. A compression spring 30 holds the sleeve 25 against the mirrored substrate 18 thereby preventing it from rotating and changing the plane of polarization.

The Brewster window assembly 24, as heretofore described, has several advantages over the prior art. The entire assembly may be tested on an appropriate external mirror test laser having the discharge tube separated from an external mirror so the Brewster window assembly 24 may be interposed directly in the path between the discharge tube and the external mirror. If the Brewster window assembly 24 permits the test laser to function properly, then it may be inserted into a permanent location within the anode sleeve 17 and sealed in place. In contrast to the prior art mounting methods, once the present invention has been found to permit the test laser to lase, the window will most certainly function properly in its permanent placement. In the prior art it was seldom known to any degree of certainty whether the device would lase due to any number of variables. For instance, it could not be certain that the window was oriented at the proper Brewster angle. In the prior art version using coil springs or fingers to mount the window, it was not certain that too much force was being applied to the window thereby affecting polarization. Also, when the laser tube was heated to 450° C. for sealing the mirror to the tube, the metal of the spring could be annealed, thereby allowing the window to shift, affecting the alignment and polarization.

Another advantage of the present invention is that the Brewster window is protected by the sleeve and chipping off of the window edges is prevented. Thus, glass particles and dust would not interfere with the laser's function.

Figure 2:
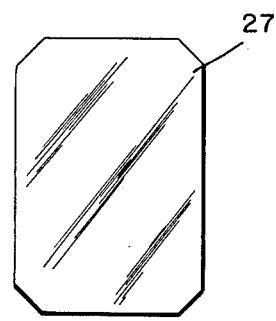
FIG. 2 is a rectangular Brewster window for mounting within the mounting sleeve.

Referring now to FIG. 2, a Brewster window 27 is illustrated having peripheral angles of greater than 90°. It is noted that the corners are cut at 45° angles to the sides of the rectangular window. Heretofore, most prior art Brewster windows were cut at an angle from a glass rod, thereby forming an elliptical window. Also, the edges of the window were at an acute angle, and thus very sharp, in order that the there be a snug fit of the window within the discharge tube. It is these sharp edges which have a tendency to break off or to be abraded off as the window is being placed within the laser cavity. Having a rectangular or oval window which is protected by a metal sleeve, as is the case in the present invention, provides protection previously not afforded a Brewster window of the prior art.

A decided advantage of the present invention is that the angle of the Brewster window is now more certain after assembly into place than in the prior art. The window has the mounting angle which is determined by the manufacturing tolerance of the sleeve 25. The Brewster angle of the window is not dependent upon the skills of the technician who assembles the window but the machinist who machines the slot in the sleeve and as such precise alignment is readily possible and probable.

Figure 3:
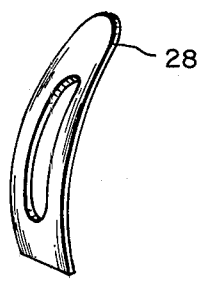
FIG. 3 is a spring for retaining a Brewster window within the mounting sleeve.

The leaf spring 28 is now described with regards to FIG. 3. The spring 28 has an elliptical shape which is truncated at one end where it rests against the bottom of the slot in the sleeve 25. The spring 28 has an opening, shown here as being elliptical for allowing the light to pass therethrough. The material may be a ferrous-nickel alloy which is not annealed upon heating to 450° C. for sealing the laser cavity. The Brewster window is held in place by the minimal pressure applied by the spring whose spring characteristics are such that the window is not deformed.

Other mechanical fastening methods may also be used in lieu of the leaf spring such as, for example, a wedge or shim. Such non-mechanical fastening methods as epoxy or other adhesives may also be used, though not with hard sealing techniques due to heat. Even a glass frit may be used to fasten the window 27 to the sleeve.

Although the invention has been shown and described with respect to specific embodiments, nevertheless, certain modifications and changes made by one skilled in the art to which the invention pertains are deemed within the purview of the invention.

What is claimed is:

1. A Brewster window mount comprising:
   an elongated annular sleeve having a transverse slot disposed at the Brewster angle for supporting a Brewster window mounted within said slot;
   a Brewster window disposed within said slot; and
   a leaf spring disposed within said transverse slot and adjacent to said Brewster window for maintaining said window in place.

2. A laser having an improved Brewster window mount, comprising:
   a laser discharge tube having an optical axis;

an elongated annular sleeve having a transverse slot at the Brewster angle for supporting a Brewster window mounted within said slot, said sleeve being at one end of said laser discharge tube and optically aligned therewith;

a Brewster window disposed within said slot; and a leaf spring disposed within said transverse slot and adjacent to said Brewster window for maintaining said Brewster window in place.

3. A laser having an improved Brewster window mount, comprising:

a laser discharge tube having an optical axis, and having a chamber at one end thereof for mounting a Brewster window, said laser discharge tube for containing a lasing medium;

an elongated annular member having a transverse slot at the Brewster angle for supporting a Brewster window mounted within said slot;

a Brewster window disposed within said slot; and a leaf spring disposed within said transverse slot and adjacent to said Brewster window for maintaining said Brewster window in place.

* * * * *